United States Patent
Favero

(10) Patent No.: US 9,663,704 B2
(45) Date of Patent: May 30, 2017

(54) PROCESS FOR THE ENHANCED RECOVERY OF OIL BY INJECTION OF A POLYMER SOLUTION

(71) Applicant: S.P.C.M. SA, Andrezieux Boutheon (FR)

(72) Inventor: Cedrick Favero, Saint Romain le Puy (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days.

(21) Appl. No.: 14/364,064

(22) PCT Filed: Jan. 14, 2013

(86) PCT No.: PCT/IB2013/050349
§ 371 (c)(1),
(2) Date: Jun. 9, 2014

(87) PCT Pub. No.: WO2013/108173
PCT Pub. Date: Jul. 25, 2013

(65) Prior Publication Data
US 2014/0326457 A1    Nov. 6, 2014

(30) Foreign Application Priority Data

Jan. 20, 2012 (FR) ...................... 12 50582

(51) Int. Cl.
*E21B 43/16* (2006.01)
*E21B 43/22* (2006.01)
*C09K 8/588* (2006.01)
*C08F 220/56* (2006.01)
*C08F 220/34* (2006.01)
*C08F 220/58* (2006.01)
*C08F 226/10* (2006.01)

(52) U.S. Cl.
CPC ............ *C09K 8/588* (2013.01); *C08F 220/56* (2013.01); *E21B 43/16* (2013.01); *C08F 220/34* (2013.01); *C08F 220/58* (2013.01); *C08F 226/10* (2013.01)

(58) Field of Classification Search
CPC .......... C09K 8/512; C09K 3/18; C09K 8/588; C09K 8/24; C09K 8/608; C09K 8/685; C09K 8/428; C09K 8/44; C09K 8/467; E21B 43/16; E21B 33/13; E21B 43/267
See application file for complete search history.

(56) References Cited

U.S. PATENT DOCUMENTS

| | | | | |
|---|---|---|---|---|
| 4,951,921 A * | 8/1990 | Stahl | ........... | C08F 226/06 166/270 |
| 5,650,633 A | 7/1997 | Ahmed et al. | | |
| 5,883,210 A | 3/1999 | Ahmed et al. | | |
| 2010/0036017 A1* | 2/2010 | Eoff | ........... | C04B 28/02 523/130 |
| 2011/0118153 A1 | 5/2011 | Pich et al. | | |
| 2012/0058922 A1* | 3/2012 | Favero | ........... | C08K 5/005 507/226 |
| 2012/0305247 A1* | 12/2012 | Chen | ........... | C09K 8/74 166/280.1 |

FOREIGN PATENT DOCUMENTS

| | | |
|---|---|---|
| WO | 9722638 A1 | 6/1997 |
| WO | 2008107492 A1 | 9/2008 |
| WO | 2010133258 A1 | 11/2010 |

OTHER PUBLICATIONS

International Search Report and Written Opinion, PCT International Application No. PCT/IB2013/050349, mailed May 3, 2013.
Thomas, "Enhanced Oil Recovery—An Overview," Oil & Gas Science and Technology, 2008, pp. 9-19, vol. 63, No. 1.

* cited by examiner

*Primary Examiner* — Zakiya W Bates
(74) *Attorney, Agent, or Firm* — Wozny Law, LLC; Thomas M. Wozny

(57) ABSTRACT

Process for the enhanced recovery of oil comprising introducing into an injection fluid at least one linear or structured water-soluble copolymer obtained by polymerization of 2-acrylamido-2-methylpropane sulfonic acid monomer in free acid and/or salified form with acrylamide derivative monomers having the formula $H_2C=CR-C(=O)-A$ in which R is H or $CH_3$ or $CH_2COOR'$, wherein R' is an alkyl containing not more than 3 carbon atoms, and A is selected from the group consisting of 2-pyrrolidone, pyrrolidine and 4-morpholine, and injecting the injection fluid, which is then viscosified, into a reservoir, and thereafter recovering the aqueous and oily and/or gaseous mixture.

20 Claims, No Drawings

PROCESS FOR THE ENHANCED RECOVERY OF OIL BY INJECTION OF A POLYMER SOLUTION

The present invention relates to the technical field of enhanced oil recovery from a subterranean formation. More precisely, the present invention relates to an improved process for the enhanced recovery for oil which consists in introducing into the subterranean formation of an aqueous solution of an uncrosslinked water-soluble polymer obtained by polymerization of a cyclic acrylamide derivative monomer and of 2-acrylamido-2-methylpropane sulfonic acid (ATBS) in free acid and/or salified form.

The majority of the oil fields that are currently being exploited have become mature and, accordingly, have begun the decline in their production or are on the point of doing so. The recovery factor of those fields is currently approximately from 15 to 35% on average, relative to the original quantity of oil. They therefore offer a still considerable production potential.

Generally, the recovery of the crude oil contained in the subterranean formation s is carried out in several phases.

Production is the result firstly of the natural energy of the fluids and of the rock, which are decompressed. At the end of this phase of depletion, the quantity of oil recovered at the surface represents on average from 5 to 15% of the original reserve. It is therefore necessary in a second phase to employ techniques which aim to increase the recovery rate while maintaining the pressure of the field.

The process that is most frequently employed consists in injecting water into the subterranean formation by means of injection wells dedicated to that purpose. This is referred to as secondary recovery. This second phase stops when the water/oil ratio is too high, that is to say when the quantity of water in the mixture produced by the production wells is too high. Secondary recovery thus allows an additional recovery factor of approximately from 10 to 20% to be obtained.

The other techniques which can be used are grouped under the name enhanced oil recovery (EOR). Their aim is to recover between 10 and 35% of additional oil relative to the original amount of oil. The term "enhanced oil recovery" encompasses various thermal techniques or non-thermal techniques such as the so-called electrical, miscible, steam or chemical enhanced in situ oil recovery techniques (see "Oil & gas science and technology"—revue IFP, vol. 63 (2008) no. 1, pp. 9-19). Oil denotes any type of oil, namely light oil as well as heavy and even bituminous oil.

The present invention relates more precisely to enhanced oil recovery by chemical means, which involves the continuous injection of an aqueous solution comprising at least one water-soluble polymer in the form of a dilute solution, said aqueous solution being capable of pushing the oil out of the subterranean formation. The object of the invention is not to gel the polymer so as to modify locally the permeability of the rock and seal the holes, which technique is known by the name "conformance" or mobility control or plugging of the water channels.

A distinction is made between enhanced oil recovery (EOR) techniques and reservoir stimulation operations. The latter are characterized by injections of polymer solution which are limited in terms of volume in order to create a localized phenomenon in the reservoir, namely for conformance, a sealing of zones of high permeability, for "water shut off", blocking zones where undesired water enters the subterranean formation. The injections are generally carried out either by an injection well or by a production well over quite short periods of time of several days, and generally less than one month, and with volumes representing less than 5% of the pore volume of the reservoir. The pore volume corresponds to the volume that is not occupied by the rock in the reservoir which provides a correlation with the permeable zone.

By contrast, enhanced oil recovery (EOR) techniques using polymers involve a continuous and prolonged injection of polymer solution in order to sweep the reservoir from an injection well to a production well. The aim is to treat not a zone of the reservoir but the totality thereof in order to recover as much oil as possible. To that end it is necessary to inject a much greater volume of aqueous solution, which is generally from 50% to 500%, or even more, of the pore volume. At the production well or wells there is recovered an aqueous, oily and sometimes gaseous mixture.

The injection of viscous polymer solution by the technique employed is carried out alone or in conjunction with other chemical compounds used in enhanced oil recovery.

In all those techniques, the effectiveness of the sweep by injection of water is generally improved by the addition of water-soluble polymers. The expected and proven benefits of the use of polymers rendering the injected water more viscous are the improvement of the areal sweep and of the mobility control in the field in order to recover the oil more rapidly and efficiently. These polymers will increase the viscosity of the injection water.

It is known to the person skilled in the art that synthetic and in particular acrylamide-based water-soluble polymers are very advantageous polymers for increasing the viscosity of aqueous solutions and accordingly are used widely in enhanced oil recovery.

However, the localized field conditions are sometimes such that they degrade the uncrosslinked polymers, and thus the desired effectiveness is not reached because the viscosity of the fluid actually sweeping the field is lower than needed.

Field conditions that degrade the uncrosslinked water-soluble polymers are understood as being high temperatures of more than 90° C. and which can exceed 110° C., and high salinities of more than 50 g/l, which can exceed 100 g/l.

Document U.S. Pat. No. 5,650,633 describes the injection of gels, that is to say aqueous solutions comprising a post-crosslinked polymer, into a subterranean formation. The polymers in question are crosslinked polymers comprising nitrogen-containing olefinic compounds such as internal salts derived from compounds such as piperazinium and ammonium, in the form of sulfobetaine or polyquaternary salts. The polymeric solution that is injected comprises the polymer in association with a crosslinking agent or bentonite.

The various oil-field operations described in document U.S. Pat. No. 5,650,633 relate to drilling, operations of consolidating the tubing once drilling has been carried out, and especially cementing of the tube, curative and maintenance treatment of the oil wells, modification or correction of the permeability of the reservoir, operations for preventing coning, a capillary phenomenon which is observed at the bottom of the well and which causes a reduction in the oil extraction performance, operations of acidification of the reservoir matrix in order to enlarge the pores, the injection pressure being lower than the fracture pressure, and finally operations of acid fracturing, the aim of which is to fracture the source rock in order to reach inaccessible pockets of oil or gas, and for which the injection pressures are greater than the fracture pressures of the rock and can reach more than 150 bars.

More particularly, that document presents solutions in the field of drilling and conformance fluids, namely the modification of the permeability of subterranean formations by virtue of the in situ formation of gels, which obstruct undesirable channels.

Those linear polymers post-crosslinked in situ are not suitable for the application of enhanced oil recovery by chemical means, given that they are unable to propagate far into the formation and provides a uniform and effective sweep of the reservoir. In fact, the gel seals the holes of the reservoir and does not serve to push the oil. Conformance treatment is selective and has the aim of modifying the permeability of the reservoir in a localized manner. It typically uses polymers of low molecular weights and, without crosslinking, does not provide the necessary mobility control. On the contrary, in order to improve enhanced oil recovery by chemical means, a viscosified (non-gelled) solution must push the oil uniformly to the production well.

Document U.S. Pat. No. 4,951,921 describes copolymers based on ATBS (or AMPS) and VP (vinylpyrrolidone) for enhanced oil recovery.

Documents WO 97/22638 and U.S. Pat. No. 5,883,210 describe ATBS/acrylamide derivative copolymers comprising a piperazine ring. The presence of an additional nitrogen on the ring may generate interchain bonds between the pendant chains of the polymer, which may lead to the gelling thereof in aqueous solution. Those solutions are used more particularly for conformance and drilling operations. They cannot be used for enhanced oil recovery, where the solution must remain sufficiently fluid to sweep the entire well.

Document WO 97/22638 also describes 2-acrylamido-2-methylpropane sulfonic acid (ATBS)/acryloyl-morpholine (ACMO) copolymers for drilling and conformance applications, for which the polymer is gelled.

There is a need for novel solutions which allow enhanced oil recovery by chemical means to be improved, including under extreme conditions of high temperatures and high salinities.

The Applicant has found that, surprisingly and wholly unexpectedly, the specific combination of cyclic acrylamide derivative monomer and 2-acrylamido-2-methylpropane sulfonic acid (ATBS) in free acid and/or salified form allows teaching performances unequalled in terms of enhanced oil recovery by chemical means, when the field conditions are extremely damaging to the polymer.

More precisely, the present invention relates to a process of enhanced oil recovery, comprising:
  introducing into the injection fluid at least one linear or structured water-soluble copolymer obtained by polymerization of:
    2-acrylamido-2-methylpropane sulfonic acid monomer in free acid and/or salified form,
    acrylamide derivative monomers of formula (I):

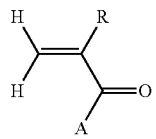

in which:
    R=H or $CH_3$ or $CH_2COOR'$, wherein R' is an alkyl containing not more than 3 carbon atoms,
    A is an N-heterocycle containing in its ring from 4 to 6 carbon atoms; and optionally an ether functional group or a ketone functional group, injecting the injection fluid, which is then viscosified, into the reservoir,
  recovering the aqueous and oily and/or gaseous mixture.

Generally, the salt of the monomer 2-acrylamido-2-methylpropane sulfonic acid (ATBS) can be an alkali metal salt such as, for example, the sodium salt or the potassium salt, an ammonium salt, a salt of an amino alcohol such as, for example, the monoethanolamine salt or an amino acid salt.

In a particular embodiment, A is selected from the group consisting of 2-pyrrolidone, pyrrolidine and 4-morpholine.

Advantageously, the acrylamide derivative monomer of formula (I) is selected from the group consisting of acryloylpyrrolidone, acryloylpyrrolidine and acryloylmorpholine.

According to a preferred embodiment, the copolymer is advantageously obtained by polymerization of:
  more than 5 mol %, advantageously and strictly less than 60 mol %, of monomer 2-acrylamido-2-methylpropane sulfonic acid (ATBS) in free acid and/or salified form, preferably from 10 to 50 mol %, yet more preferably from 15 to 40 mol %, and yet more preferably from 20 to 30%;
  strictly more than 10 mol % and less than 95 mol % of monomer of formula (I), preferably from 15 to 70 mol %, yet more preferably from 20 to 60 mol %, and yet more preferably from 25 to 50%.

According to another embodiment, the linear or structured water-soluble copolymer can further be obtained by the copolymerization not only of monomer 2-acrylamido-2-methylpropane sulfonic acid (ATBS) in free acid and/or salified form and of monomer of formula (I), but also with:
  at least one hydrophilic monomer which is
    non-ionic and can be selected from the group consisting of acrylamide, methacrylamide, N,N-dimethylacrylamide, N-vinylpyrrolidone, N-vinylformamide, the methacrylates of polyethylene glycol, diacetoneacrylamide, N-isopropylacrylamide, 2-hydroxyethyl acrylate, 2,3-dihydroxypropyl acrylate, 2-hydroxyethyl methacrylate, 2,3-dihydroxypropyl methacrylate,
    and/or anionic, such as, for example, acrylic acid, methacrylic acid, itaconic acid, maleic acid, non-salified, partially or completely salified,
    and/or cationic, such as, for example, diallyldimethylammonium chloride (DADMAC), dialkylaminoethyl acrylate (DAMEA) and dialkylaminoethyl methacrylate (DAMEMA), acrylamido dialkylaminopropyl, methacrylamido dialkylaminopropyl, and their acidified or quaternized salts;
  and/or
  at least one monomer of hydrophobic nature which can be selected from the group consisting of N-alkylacrylamides, dialkylacrylamides, acrylic acid derivatives such as alkyl acrylates or methacrylates such as, for example, 25-ethoxylated behenyl methacrylate.

The copolymer can further be structured by at least one structure agent, which can be selected from the group consisting of polyethylenically unsaturated monomers (having at least two unsaturated functional groups), such as, for example, vinyl, allyl, acrylic and epoxy functional groups, and there may be mentioned, for example, methylenebisacrylamide (MBA), triallylamine, or by macroinitiators such as the polyperoxides, polyazo compounds and transfer polyagents such as polymercaptan polymers.

According to the invention, the polymer is not cross-linked. It can be linear or structured, that is to say branched, star or comb.

Structured polymer denotes a non-linear polymer which has side chains so as to obtain, when the polymer is dissolved in water, a high level of entanglements leading to very high viscosities at low shear rates.

The primary function of the polymers according to the invention is to viscosify the water injected into reservoirs containing oil in order to improve the mobility control without crosslinking, that is to say interchain chemical bridging, being necessary.

For an identical structure and chemistry, the longer the size of the polymer chain, the higher the viscosity. This is associated with physical entanglements between the chains, creating resistance to molecular mobility, which generates viscosity. Within the scope of the present application, it is therefore advantageous to use polymers of high molecular weight.

"High molecular weight" denotes molar masses of at least 1 million g/mol, preferably from 2 to 30 million, more preferably from 2.5 to 20 million.

The process conventionally used to measure the molar mass of water-soluble polymers is measurement of the intrinsic viscosity, which is the relative or inherent viscosity of a solution of polymer at infinite dilution. To that end, the flow time of a solution of polymer diluted at various concentrations is measured in an Ubbelohde tube of variable diameter. The diameter is chosen so that the flow is sufficiently slow that the measurement is accurate and repeatable and the difference in the flow time between the solution without polymer and the solution with polymer is at least 25%.

This measurement is lengthy, and it is conventional in practice either to obtain an approximation of the molecular weight by single-point measurement of the relative viscosity or of the inherent viscosity, at a high dilution, so that the latter is close to infinite dilution and the calculated viscosity is therefore close to the intrinsic viscosity.

Another approach is to measure the UL viscosity expressed in cps (centipoises), and is carried out using a Brookfield viscometer [UL spindle, speed of rotation 6 rounds per minute (rpm)] at 25° C. in a 1M aqueous NaCl solution containing 0.1% by weight of the polymer.

For water-soluble polymers having similar compositions and chemical structures, this allows the most accurate and most rapid approximation of the molecular weight. By way of example, the values for the polymer AM/ATBS (molar ratio 75/25 acrylamide and ATBS) are as follows:

| UL viscosity | 2.5 cps | 4.9 cps |
|---|---|---|
| inherent viscosity | 5.8 dl/g | 10.65 dl/g |
| intrinsic viscosity | 6 dl/g | 11 dl/g |
| molecular weight | 3 million g/mol | 8 million g/mol |

In the examples, UL measurement will be used as the mean for comparing the molecular weights obtained, owing to its simplicity.

It has also been found that the polymers according to the invention offer good properties of sweeping of the reservoir thanks to their good stability of the viscosity in the injected fluid, including when the temperatures of the reservoir are greater than 90° C. and even greater than 110° C. or greater than 130° C. in some cases, and/or when the injected fluid contains large quantities of salts.

Large quantities of salts are understood to mean concentrations of salts which can exceed 100,000 ppm of salts, or are even greater than 200,000 ppm of salts and sometimes more than 250,000 ppm of salts. The salts can be, for example, sodium salts, magnesium salts, calcium salts, potassium salts.

It is well known that the injected fluid can encounter high temperatures and high salinities in some reservoirs and/or in some zones of reservoirs. This has the effect of degrading the polymer, which causes a drop in the viscosity and therefore a reduction in the sweep efficiency and in the oil recovery rates.

It has been observed that, even under such extreme conditions of temperature and/or salinity, the ability of the polymers of the invention to effectively sweep the reservoir is not notably affected. This allows the enhanced oil recovery rates to be improved substantially.

According to the invention, the water-soluble polymers that are used do not require the development of a particular polymerization process. They can be obtained by all the polymerization techniques known to the person skilled in the art (solution polymerization, suspension polymerization, gel polymerization, precipitation polymerization, emulsion polymerization (aqueous or inverse), which may or may not be followed by a spray drying step, suspension polymerization, micellar polymerization, which may or may not be followed by a precipitation step, post-hydrolysis or co-hydrolysis polymerization, so-called "template" polymerization, radical polymerization, or controlled radical polymerization.

The polymer is preferably in the form of a powder or inverse emulsion. In the case where it is in the form of an inverse emulsion, it can be dissolved either directly in the brine or injection fluid or using the process described in document US 2011/0118153, which proposes the dissolution, in line and continuously, of inverse emulsions of water-soluble polymers.

In the case where it is in the form of a powder, the dissolution can be carried out, especially, by means of a unit as described in document WO 2008/107492 and marketed by the Applicant under reference PSU "Polymer Slicing Unit".

Further details of the unit which can be used within the scope of the present invention for incorporating the polymer-based composition into the aqueous solution are provided in document WO 2008/107492. That unit operates under an inert atmosphere and allows to reduce the risks of introducing oxygen in the step of dissolving the polymer in the aqueous solution.

The polymers of the invention can be associated, if necessary, before they are dissolved in the water, with stabilizing compounds in the manner described in patent application WO 2010/133258.

In that case, the polymer is employed by dissolution in water or in a brine, the form which is most often encountered in oil exploitation fields.

Generally, the injection fluid comprises, after introduction of the aqueous solution viscosified by the polymer or polymers, from 20 ppm to 5000 ppm by weight of one or more water-soluble copolymers as described above, preferably from 300 ppm to 4000 ppm.

The aqueous solution can further comprise:
at least one surfactant. The surfactants can be chosen, for example, from the anionic surfactants and their zwitterions selected from the group consisting of the derivatives of alkyl sulfates, alkyl ether sulfates, arylalkyl sulfates, arylalkyl ether sulfates, alkyl sulfonates, arylalkyl ether sulfonates, arylalkyl sulfonates, arylalkyl ether sulfonates, alkyl phosphates, alkyl ether phosphates, arylalkyl phosphates, arylalkyl ether phosphates, alkyl phosphonates, alkyl ether phosphonates, arylalkyl phosphonates, arylalkyl ether phosphonates, alkyl carboxylates, alkyl ether carboxylates, arylalkyl carboxylates, arylalkyl ether carboxylates, the alkyl polyethers, and arylalkyl polyethers. Within the scope of the invention, "alkyl" is understood as being a hydrocarbon group, saturated or unsaturated, having from 6 to 24 carbon atoms, branched or unbranched, linear or optionally comprising one or more cyclic units, which can optionally comprise one or more heteroatoms (O, N, S). An arylalkyl group is defined as an alkyl group as defined above comprising one or more aromatic rings, said aromatic rings optionally comprising one or more heteroatoms (O, N, S).

and/or at least one alkaline agent which can be chosen from the alkali metal or ammonium hydroxides, carbonates and bicarbonates, such as sodium carbonate.

and/or at least one oil dispersing agent such as modified or unmodified polyvinyl alcohol, polyvinyl acetates or polyalkylene glycols of low molecular weight, at least one stabilizing agent such as, for example, ITW, aqueous solution comprising 15% by weight thiourea and 7.5% by weight isopropyl alcohol.

Advantageously, the injection fluid, after introduction of the aqueous solution of water-soluble polymer, has a viscosity of from 2 to 200 cps (centipoises) [viscosity measurements at 20° C. using a Brookfield viscometer with a UL spindle and at a speed of 6 rounds per minute (rpm)].

Within the scope of the invention, the viscosified aqueous solution comprising the desired polymer or polymers is then injected into a subterranean formation containing oil by any technique known to the person skilled in the art in process of enhanced oil recovery, also called "EOR". It is prepared on site, just before it is injected into the subterranean formation. Generally, all the components that are introduced into the aqueous solution are in most cases added in a main line containing the aqueous solution or of brine.

The invention and the advantages arising therefrom will become apparent from the following embodiment examples.

1. SYNTHESIS AND CHARACTERIZATION

The following polymers were produced by gel polymerization and then converted to powder form. The compositions and the UL viscosity have been recorded in Table 1 below:

| Polymer | AM | ATBS | NVP | APO | API | ACMO | UL (cps) |
|---|---|---|---|---|---|---|---|
| A | 80 | | | | | 20 | 3.95 |
| B | 80 | 20 | | | | | 4.9 |
| C | 50 | 25 | 25 | | | | 3.3 |
| D | 80 | 15 | | | 5 | | 4.3 |
| E | 25 | 25 | 50 | | | | 3.1 |
| F | 80 | 8 | | | | 12 | 4.1 |
| G | | 50 | | | | 50 | 3.2 |
| H | 70 | 15 | | 15 | | | 3.9 |
| I | 50 | 25 | | | 25 | | 3.3 |
| J | 34 | 33 | | 33 | | | 3.3 |

AM = acrylamide
ATBS = 2-acrylamido-2-methylpropane sulfonic acid
NVP = N-vinylpyrrolidone
APO = acryloylpyrrolidone
API = acryloylpyrrolidine
ACMO = acryloylmorpholine

2. STABILITY TESTS NO. 1

Polymers A, B, D and F were tested under the conditions described hereinbelow. In a glove box in which the oxygen concentration is controlled (less than 10 ppb), 1500 ppm of each of the polymers were dissolved in brine no. 1 with a very high salt content. After dissolution of the polymer, the viscosity was measured at 25° C. (Brookfield, UL spindle speed 6 rounds per minute) at $t_0$, and then the solutions were placed at 110° C. A viscosity measurement, performed at 20° C., is carried out after 30 days and after 240 days, which corresponds to the time for which the solution is likely to remain in the subterranean formation.

The losses in viscosity expressed in % correspond to the difference between the initial viscosity and the viscosity after 240 days' ageing, the whole being divided by the initial viscosity.

Composition of Brine No. 1
100 g/l of NaCl
10 g/l of $CaCl_2$

The results are recorded in Table 2 below:

| Polymer | Viscosity at $t_0$ (cps) | Viscosity at 30 days (cps) | Viscosity at 240 days (cps) | Loss of viscosity |
|---|---|---|---|---|
| A | 6 | 9 | 1 | 83% |
| B | 12 | 13 | 1 | 92% |
| D | 10 | 12 | 6 | 40% |
| F | 8 | 9 | 7 | 12.5% |

The aqueous solutions produced from polymers D and F according to the invention have lost little of their viscosity after 240 days, whereas those produced using the other polymers A, B have lost about 90%.

The slight increase in viscosity after 30 days is explained by the hydrolysis of the acrylamide.

3. STABILITY TESTS NO. 2

Polymers E and G were tested under the conditions described hereinbelow. In a glove box in which the oxygen concentration is controlled (less than 10 ppb), 2500 ppm of each of the polymers were dissolved in brine no. 2 with a very high salt content. After dissolution of the polymer, the viscosity was measured at 25° C. (Brookfield, UL module speed 6 revolutions per minute) at $t_0$, and then the solutions were placed at 130° C. A viscosity measurement, performed at 20° C., is carried out after 30 days and after 240 days, which corresponds to the time for which the solution is likely to remain in the subterranean formation.

Composition of Brine No. 2
125 g/l of NaCl
35 g/l of $CaCl_2$
13 g/l of $MgCl_2$ The results are recorded in Table 3 below:

| Polymer | Viscosity at t0 (cps) | Viscosity at 30 days (cps) | Viscosity at 240 days (cps) | Loss of viscosity |
|---|---|---|---|---|
| E | 8 | 8 | 4 | 50% |
| G | 11 | 11 | 10 | 10% |

The aqueous solution produced from polymer G according to the invention has lost only 10% of its viscosity after 240 days, whereas that produced with polymer E has lost 50%.

It is noted that polymer G viscosifies more effectively and more durably.

4. STABILITY TEST NO. 3

Polymers C, H, I and J were tested under the conditions described hereinbelow. In a glove box in which the oxygen concentration is controlled (less than 10 ppb), 2500 ppm of each of the polymers were dissolved in brine no. 3 with a very high salt content. After dissolution of the polymer, the viscosity was measured at 25° C. (Brookfield, UL spindle speed 6 rounds per minute) at $t_0$, and then the solutions were placed at 120° C. A viscosity measurement, performed at 20° C., is carried out after 30 days and after 240 days, which corresponds to the time for which the solution is likely to remain in the subterranean formation.

Composition of Brine No. 3:
50 g/l of NaCl
5 g/l of $CaCl_2$

The results are recorded in Table 4 below:

| Polymer | Viscosity at $t_0$ (cps) | Viscosity at 30 days (cps) | Viscosity at 240 days (cps) | Loss of viscosity |
|---|---|---|---|---|
| C | 10 | 9 | 6 | 40% |
| H | 13 | 14 | 9 | 31% |
| I | 14 | 14 | 11 | 21% |
| J | 13 | 13 | 12 | 8% |

Polymers H, I and J according to the invention offer better resistance to the conditions of high temperatures and high salinities than does polymer C, giving an additional 50 to 100% viscosity after 240 days and therefore a better effect when sweeping of the reservoir.

The invention claimed is:

1. Process of enhanced oil recovery, comprising:
   (a) introducing into an injection fluid at least one linear or structured water-soluble copolymer obtained by polymerization of:
      (i) 2-acrylamido-2-methylpropane sulfonic acid monomer in free acid and/or salified form, and
      (ii) acrylamide derivative monomers of formula (I):

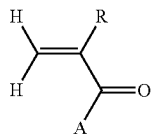

in which
      (iii) R=H or $CH_3$ or $CH_2COOR'$, wherein R' is an alkyl containing not more than 3 carbon atoms, and
      (iv) A is selected from the group consisting of 2-pyrrolidone, pyrrolidine and 4-morpholine;
   (b) injecting the injection fluid, which is then viscosified, into a reservoir; and
   (c) recovering the aqueous and oily mixture.

2. Process according to claim 1, wherein the salified form of the monomer 2-acrylamido-2-methylpropane sulfonic acid is an alkali metal salt selected from the group consisting of a sodium salt, a potassium salt, an ammonium salt, an amino alcohol salt and an amino acid salt.

3. Process according to claim 1 wherein the water-soluble copolymer is obtained by polymerization of:
   (a) more than 5 mol % and strictly less than 60 mol % of monomer 2-acrylamido-2-methylpropane sulfonic acid in free acid and/or salified form; and
   (b) strictly more than 10 mol % and less than 95 mol % of monomer of formula (I).

4. Process according to claim 3 wherein the water-soluble copolymer is obtained by polymerization of from 10 mol % to 50 mol % of monomer 2-acrylamido-2-methylpropane sulfonic acid in free acid and/or salified form.

5. Process according to claim 3 wherein the water-soluble copolymer is obtained by polymerization of from 15 mol % to 70 mol % of monomer of formula (I).

6. Process according to claim 1 wherein the water-soluble copolymer is obtained by polymerization of:
   (a) from 15 mol % to 40 mol % of monomer 2-acrylamido-2-methylpropane sulfonic acid; and
   (b) from 20 mol % to 60 mol % of monomer of formula (I).

7. Process according to claim 6 wherein the water-soluble copolymer is obtained by polymerization of from 20 mol % to 30 mol % of monomer 2-acrylamido-2-methylpropane sulfonic acid.

8. Process according to claim 6 wherein the water-soluble copolymer is obtained by polymerization of from 25 mol % to 50 mol % of monomer of formula (I).

9. Process according to claim 1 wherein the water-soluble copolymer further comprises at least one hydrophilic monomer selected from the group consisting of:
   (a) non-ionic monomers selected from the group consisting of acrylamide, methacrylamide, N,N-dimethylacrylamide, N-vinylpyrrolidone, N-vinyl formamide, polyethylene glycol methacrylates, diacetoneacrylamide, N-isopropylacrylamide, 2-hydroxyethyl acrylate, 2,3-dihydroxypropyl acrylate, 2-hydroxyethyl methacrylate, 2,3-dihydroxypropyl methacrylate; and/or
   (b) anionic monomers selected from the group consisting of acrylic acid, methacrylic acid, itaconic acid, maleic acid, non-salified, partially or completely salified; and/or
   (c) cationic monomers selected from the group consisting of diallyldimethylammonium chloride (DADMAC), dialkylaminoethyl acrylate (DAMEA), and dialkylaminoethyl methacrylate (DAMEMA), acrylamido dialkylaminopropyl, methacrylamido dialkylaminopropyl and their acidified or quaternized salts.

10. Process according to claim 1 wherein the water-soluble copolymer further comprises at least one monomer of hydrophobic nature selected from the group consisting of N-alkylacrylamides, dialkylacrylamides and 25-ethoxylated behenyl methacrylate.

11. Process according to claim 1 wherein the water-soluble copolymer represents from 20 ppm to 5000 ppm relative to the weight of the injection fluid.

12. Process according to claim 11 wherein the water-soluble copolymer represents from 300 ppm to 4,000 ppm relative to the weight of the injection fluid.

13. Process of enhanced oil recovery, comprising:
   (a) introducing into an injection fluid at least one linear or structured water-soluble copolymer obtained by polymerization of:
      (i) 2-acrylamido-2-methylpropane sulfonic acid monomer in free acid and/or salified form, and
      (ii) an acrylamide derivative monomer selected from the group consisting of acryloylpyrrolidone, acryloylpyrrolidine and acryloylmorpholine;
   (b) injecting the injection fluid, which is then viscosified, into a reservoir; and
   (c) recovering the aqueous and oily mixture.

14. Process according to claim 13 wherein the salified form of the monomer 2-acrylamido-2-methylpropane sulfonic acid is an alkali metal salt selected from the group consisting of a sodium salt, a potassium salt, an ammonium salt, an amino alcohol salt and an amino acid salt.

15. Process according to claim 13 wherein the water-soluble copolymer is obtained by polymerization of:
    (a) more than 5 mol % and strictly less than 60 mol % of monomer 2-acrylamido-2-methylpropane sulfonic acid in free acid and/or salified form; and
    (b) strictly more than 10 mol % and less than 95 mol % of said acrylyamide derivative monomer.

16. Process according to claim 13 wherein the water-soluble copolymer further comprises at least one hydrophilic monomer selected from the group consisting of:
    (a) non-ionic monomers selected from the group consisting of acrylamide, methacrylamide, N,N-dimethylacrylamide, N-vinylpyrrolidone, N-vinyl formamide, polyethylene glycol methacrylates, diacetoneacrylamide, N-isopropylacrylamide, 2-hydroxyethyl acrylate, 2,3-dihydroxypropyl acrylate, 2-hydroxyethyl methacrylate, 2,3-dihydroxypropyl methacrylate; and/or
    (b) anionic monomers selected from the group consisting of acrylic acid, methacrylic acid, itaconic acid, maleic acid, non-salified, partially or completely salified; and/or
    (c) cationic monomers selected from the group consisting of diallyldimethylammonium chloride (DADMAC), dialkylaminoethyl acrylate (DAMEA), and dialkylaminoethyl methacrylate (DAMEMA), acrylamido dialkylaminopropyl, methacrylamido dialkylaminopropyl and their acidified or quaternized salts.

17. Process according to claim 13 wherein the water-soluble copolymer further comprises at least one monomer of hydrophobic nature selected from the group consisting of N-alkylacrylamides, dialkylacrylamides and 25-ethoxylated behenyl methacrylate.

18. Process according to claim 13 wherein the water-soluble copolymer represents from 20 ppm to 5000 ppm relative to the weight of the injection fluid.

19. Process according to claim 13 wherein the water-soluble copolymer represents from 300 ppm to 4,000 ppm relative to the weight of the injection fluid.

20. Process of enhanced oil recovery, comprising:
    (a) preparing in the absence of a stabilizing agent an aqueous solution of at least one linear or structured water-soluble copolymer obtained by polymerization of:
        (i) 2-acrylamido-2-methylpropane sulfonic acid monomer in free acid and/or salified form, and
        (ii) acrylamide derivative monomers of formula (I):

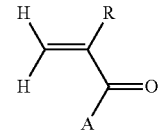

in which
        (iii) R=H or CH$_3$ or CH$_2$COOR', wherein R' is an alkyl containing not more than 3 carbon atoms, and
        (iv) A is selected from the group consisting of 2-pyrrolidone, pyrrolidine and 4-morpholine;
    (b) introducing the aqueous solution into an injection fluid:
    (c) injecting the injection fluid, which is then viscosified, into a reservoir; and
    (d) recovering the aqueous and oily mixture.

* * * * *